(12) United States Patent
Charugundla

(10) Patent No.: US 9,406,296 B2
(45) Date of Patent: *Aug. 2, 2016

(54) TWO WAY AUTOMATIC UNIVERSAL TRANSCRIPTION TELEPHONE

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/866,907

(22) Filed: Apr. 19, 2013

(65) Prior Publication Data

US 2014/0314220 A1   Oct. 23, 2014

(51) Int. Cl.
| | |
|---|---|
| *H04M 11/00* | (2006.01) |
| *G10L 15/26* | (2006.01) |
| *H04M 3/42* | (2006.01) |
| *H04L 29/08* | (2006.01) |

(52) U.S. Cl.
CPC ........... *G10L 15/26* (2013.01); *H04M 3/42391* (2013.01)

(58) Field of Classification Search
CPC .......... H04M 1/271; H04M 1/274516; H04M 1/656; H04M 2250/68
USPC ............... 379/88.13–88.15; 455/414.1–414.4
See application file for complete search history.

(56) References Cited

U.S. PATENT DOCUMENTS

| | | | |
|---|---|---|---|
| 6,504,910 B1 | 1/2003 | Engelke et al. | |
| 6,735,286 B1 | 5/2004 | Hansen et al. | |
| 6,775,360 B2 | 8/2004 | Davidson et al. | |
| 6,950,501 B1 | 9/2005 | Chaturvedi et al. | |
| 7,027,986 B2 | 4/2006 | Caldwell et al. | |
| 7,142,642 B2 | 11/2006 | McClelland et al. | |
| 7,200,208 B2 | 4/2007 | Smith, Jr. et al. | |
| 7,236,574 B2 | 6/2007 | Haldeman et al. | |
| 7,315,612 B2 | 1/2008 | McClelland | |
| 7,319,740 B2 | 1/2008 | Engelke et al. | |
| 8,917,823 B1 * | 12/2014 | Sacks et al. | ................... 379/67.1 |
| 2001/0005411 A1 | 6/2001 | Engelke et al. | |
| 2002/0057764 A1 * | 5/2002 | Salvucci et al. | ................. 379/37 |
| 2003/0235275 A1 * | 12/2003 | Beith et al. | .................... 379/67.1 |
| 2004/0203794 A1 * | 10/2004 | Brown et al. | .................. 455/445 |
| 2006/0106602 A1 | 5/2006 | Caldwell et al. | |
| 2006/0281495 A1 * | 12/2006 | Yang | ............................. 455/563 |
| 2006/0285652 A1 | 12/2006 | McClelland et al. | |
| 2007/0036282 A1 | 2/2007 | Engelke et al. | |
| 2007/0049355 A1 * | 3/2007 | Wu | ............................. 455/575.1 |
| 2008/0101455 A1 * | 5/2008 | Scheelke | ............ H04N 21/4821 375/240.01 |
| 2008/0152093 A1 | 6/2008 | Engelke et al. | |
| 2008/0187108 A1 | 8/2008 | Engelke et al. | |
| 2009/0190742 A1 | 7/2009 | Freeman et al. | |
| 2009/0262906 A1 | 10/2009 | Goldman et al. | |
| 2013/0208080 A1 * | 8/2013 | Lukasik et al. | ............ 348/14.09 |

\* cited by examiner

*Primary Examiner* — Solomon Bezuayehu

(74) *Attorney, Agent, or Firm* — Paul J. Sutton; Barry G. Magidoff

(57) ABSTRACT

A two-way automatic transcription telephone, which can operate over analog and/or digital networks and, during a telephone call, is able to automatically transcribe in real time incoming voice signals and/or outgoing voice signals of the telephone into associated text that can be displayed on a display of the telephone. The incoming and outgoing voice signals are transcribed based on settings received by the telephone via its input keyboard or touch screen input.

14 Claims, 3 Drawing Sheets

TWO WAY AUTOMATIC UNIVERSAL TRANSCRIPTION TELEPHONE

FIELD OF THE INVENTION

The present invention generally relates to the field of telecommunications. In particular, the present invention relates to a telephone that automatically transcribes telephone conversations into associated text.

BACKGROUND OF THE INVENTION

Telephones used in various available communication networks have a relatively simple architecture and provide well-known features to their users. However, users who are hearing impaired and/or who suffer from some type of speech impediment, for the most part, cannot use a typical telephone to any effective extent without subscribing to special features available from their service provider. These subscribers typically rely on voice transcribing services provided by their service provider and additional equipment that allow these subscribers to receive captioned text representing the words being spoken by another party during an established telephone call between the subscriber and the other party. The equipment may also have text transmission capabilities whereby the subscriber types his/her responses during the conversation.

At a communications center of the service provider, a communication agent having access to the established telephone converts (manually and/or with the assistance of transcription software and speech recognition software) the words spoken by the other party into captioned text and transmits such text to the subscriber. The communication agent also reads the text from the subscriber and voices the text to the other party. This particular arrangement is not only awkward, but the communication agent will be privy to any private, sensitive or privileged information that is being discussed between the subscriber and the other party during the established telephone call.

Regardless of the service provider and the communication network being used to convey (i.e., transmit and/or receive) telephone signals, a common problem is the lack of any features in the telephones themselves that are designed to address the difficulties faced by hearing impaired users and/or users with speech impediments. Indeed, as discussed above, in order for such users to use currently available telephones, they rely mainly on special services provided by telephone service providers. In many such instances, the hard of hearing user who is receiving the text is not even aware that the captioning is being done by a communication agent who is listening to his/her conversation with another party. As a result the user has a false sense of privacy during his/her conversation with the other party to the established telephone call.

BRIEF SUMMARY OF THE INVENTION

The present invention is a two way automatic universal transcription telephone (hereinafter "Transcription Telephone") that comprises at least one central processing unit, a voice circuit and at least one transcriber controlled by the central processing unit to automatically transcribe in real time, during an established telephone call involving the Transcription Telephone, voice signals being received and/or being transmitted by the voice circuit into associated text based on one or more input operation parameters (e.g., transcription telephone settings) received by the central processing unit. The associated text is displayed by a display of the Transcription telephone and a transcript of an entire telephone conversation can be stored in the Transcription Telephone or at a remote storage accessible via a communication network (e.g., the Internet) to which the Transcription Telephone is coupled. The Transcription Telephone has various settings that dictate its operation, and in particular, whether either the incoming or outgoing voice signals are to be transcribed or whether any of the incoming or outgoing voice signals are to be transcribed. A user of the Transcription Telephone may also set the operation of the telephone so that there is no transcription of any of the voice signals.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 1:
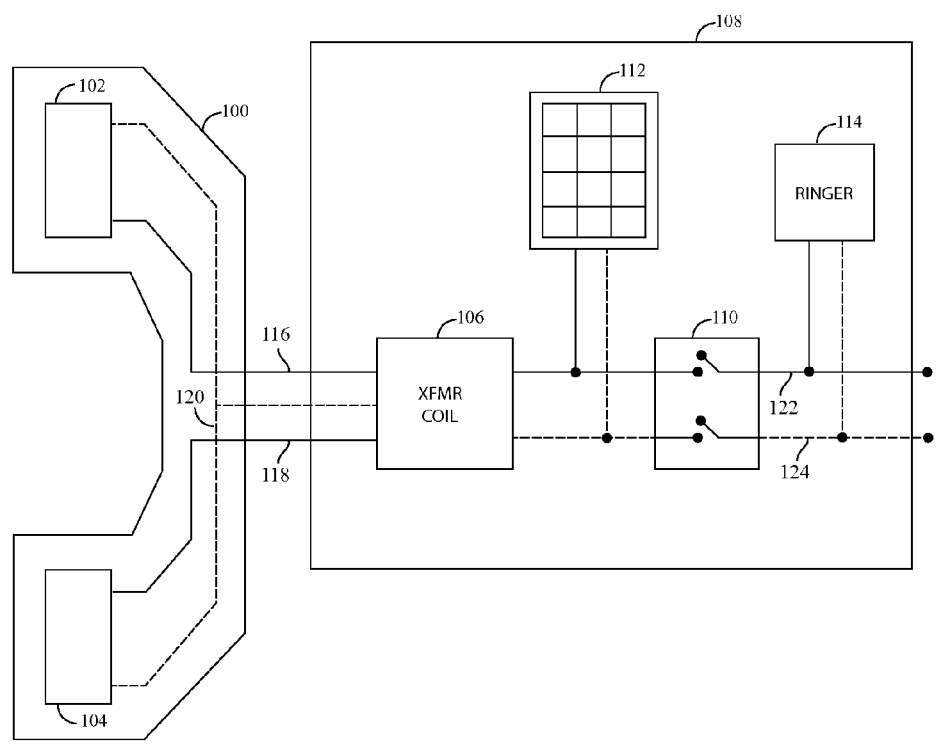
FIG. 1 is a block diagram of a prior art telephone.

A basic configuration of a prior art telephone is shown in FIG. 1. The telephone has a handset 100 and a base 108. Disposed within the handset is a speaker 102 and a microphone 104 wired as shown. The telephone shown in FIG. 1 is designed and constructed to operate in the well-known POTS (Plain Old Telephone System) and/or the PSTN (Public Switched Telephone Network) communication systems. The telephone uses a two-wire system commonly known as tip/ring wires (color coded where the tip wire is green and the ring wire is red). The ring wire has a negative DC (Direct Current) voltage and the tip wire has a voltage set at earth ground (i.e. zero volt). At the input to the telephone (i.e., the telephone line), a ringer or ringer circuit 114 is connected across the tip wire 122 and ring wire 124. A hook switch 110 is connected in series with the tip and ring wires (122, 124) respectively as shown. The ringer 114 is thus connected to the input side of the hook switch 110. On the other side of the hook switch 110 a dialer 112 is connected across the tip ring wires as shown followed by coil 106 that performs two functions. First, the coil 106 allows two wire operation in that both voice signals originating from the electrical signals generated by the microphone 104 and voice signals being received by speaker 102 use the same wires. Coil 106 and associated components (not shown) are able to route microphone voice signals through the hook switch 110 and onto the POTS network while routing incoming voice signals to the speaker 102. Second, coil 106 serves to significantly attenuate voice signals from microphone 104 before they reach speaker 102 while allowing such voice signals to pass onto the POTS network. The conductors 124 and 120 representing the ring wire are shown in dashed lines for ease of reference.

With the availability of the Internet, many telephones (commonly referred to as IP phones) are now designed to operate over the IP (Internet Protocol) network. The internal design of such IP phones may be somewhat different from the configuration shown in FIG. 1, but they operate and/or function in much the same manner as described above.

The description of the Two Way Automatic Universal Transcription Telephone of the present invention is disclosed herein using the following terms, terminology, definitions and abbreviations:

The associated text refers to readable text resulting from a voice recognition system (using voice recognition software and speech tuning algorithms) that analyzes and processes acoustics generated from voice signals. Alternatively, electrical signals representing voice signals (inputted into the system) can also be processed by such a voice recognition system to transcribe automatically electric signals representing words spoken by a person or words generated by a speaker or other voice-broadcasting device.

The term "automatic" or "automatically" refers to a process of steps and/or act(s) or tasks performed by electrical, electronic, electromechanical devices, mechanical devices, machine or systems (including the present invention) in response to information or signals inputted and/or received into such machines, devices or systems.

A communication network is any digital or analog network or any combination of such networks whereby transmission and reception of associated text, voice, video, and graphics can be achieved.

Telephone call—a communication link established between at least two parties each having a communication equipment (e.g., cell phone, telephone) allowing each of the equipment to transmit and/or receive voice, text, video, graphics and various other forms of information through operation of said equipment by an entity (e.g., one or more persons, communication equipment) where the information is transmitted over one or more communication networks in accordance with the standards and protocol of such networks.

Established telephone call refers to the provision of various communication infrastructure equipment, communication channels, communication links and other resources owned and/or controlled (at least during a telephone call) by a service provider to effectuate communications between the parties to a telephone call as per the standards and protocols of the one or more networks through which the signals of the telephone call traverse.

The term "couple" or "couple(d) to" as used herein refers to a path or a series of connected paths (permanent or temporary) that allows information (in one or more formats) or signals to flow from one point or equipment in a communication network to another point within the same equipment or another equipment in the same or different communication network in accordance with the protocol(s) of the communication network(s).

The present invention is a two way automatic universal transcription telephone (hereinafter "Transcription Telephone") that comprises at least one central processing unit, a voice circuit and at least one transcriber controlled by the central processing unit to automatically transcribe in real time, during an established telephone call involving the Transcription Telephone, voice signals received and/or transmitted by the voice circuit into associated text based on one or more input operation parameters (e.g., transcription telephone settings) received by the central processing unit. The associated text is displayed by a display of the Transcription telephone and a transcript of an entire telephone conversation can be stored in the Transcription Telephone or at a remote storage accessible via a communication network (e.g., the Internet) to which the Transcription Telephone is coupled. The Transcription Telephone has various settings that dictate its operation, and in particular, whether incoming or outgoing voice signals are to be transcribed or whether any of the incoming or outgoing voice signals are to be transcribed. A user of the Transcription Telephone may also set the operation of the telephone so that there is no transcription of any of the voice signals.

Figure 2:
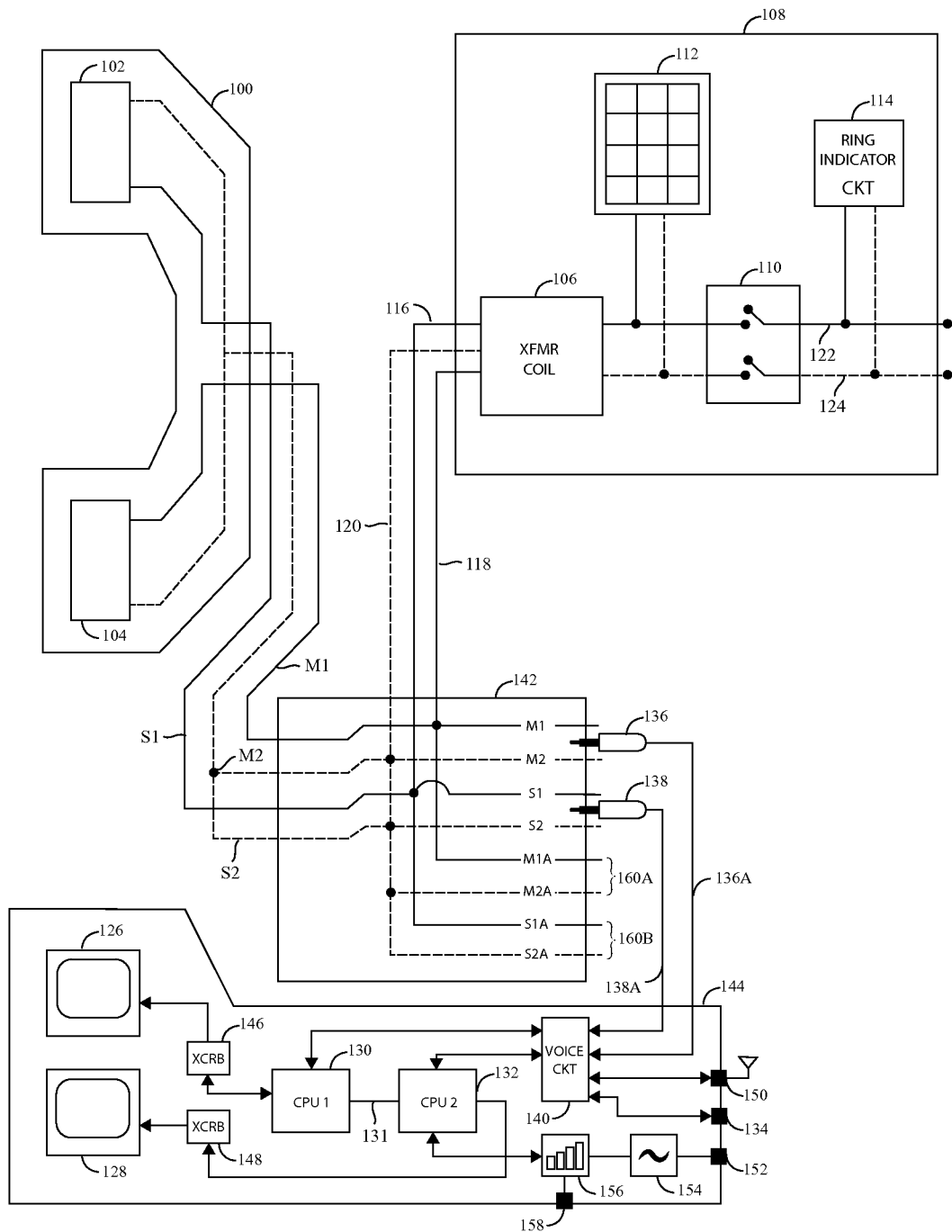
FIG. 2 is a block diagram of one embodiment of the Transcription Telephone of the present invention.

Referring to FIG. 2, the present invention is a Two Way Automatic Universal Transcription Telephone (hereinafter "Transcription Telephone") that automatically transcribes incoming and outgoing voice signals to/from the Transcription Telephone based on one or more parameters received by (e.g., received by the CPU) the Transcription Telephone. The Transcription Telephone comprises at least one central processing unit, a voice circuit and at least one transcriber controlled by the central processing unit to automatically transcribe voice signals received and/or transmitted by the voice circuit into associated text based on one or more input operation parameters (e.g., transcription telephone settings) received by the central processing unit. The operation of the Transcription Telephone of FIG. 2 will be first described in the context of a particular scenario wherein the Transcription Telephone is conveying (i.e., transmitting and/or receiving) voice signals and/or text signals via a voice circuit (to be discussed infra) to a POTS network as a result of receiving a telephone call from another telephone. It will be readily understood that the Transcription Telephone is able to interface to other types of networks at different times and can also be coupled to two or more different networks at the same time. For example, the Transcription Telephone can be connected or coupled to digital communication networks such as the Internet and operate in accordance with the IP (Internet Protocol) and also analog communication networks. Accordingly when connected to a POTS network, the Transcription Telephone of FIG. 2 is able to receive and originate telephone calls to and from the POTS network. When connected, for example, to the Internet via a Wi-Fi connection or via an Ethernet connection, the Transcription Telephone of FIG. 2 is also able to originate and receive telephone calls to and from the Internet. The POTS network and the Internet are examples of the types of networks through which the Transcription Telephone of FIG. 2 can convey information. It is readily understood that the use of Transcription Telephone of the present invention is not limited to these two networks.

Continuing with FIG. 2, telephone base 108 comprises ring indicator circuit 114, hook switch 110, dialer 112 and transformer coil 106. For the case of the Transcription Telephone receiving a call, the Transcription Telephone receives a ringing signal, which is detected by ring indicator circuit 114 causing LEDs (Light Emitting Diodes—not shown) and/or light devices (not shown) mounted onto base 108 to blink and/or shine relatively brightly thus alerting a deaf or hard of hearing person that they are receiving a phone call. Alternatively, the ring indicator circuit 114 may transmit wirelessly a signal to a device (not shown), referred to as a ring alert device, which may be worn (e.g., wristband device, neck chain device) by the user causing the device to vibrate thus alerting the user that he/she is receiving a telephone call (i.e., the telephone is ringing). This ring alert device may contain an antenna, a receiver circuit and a transducer that vibrates in response to a certain trigger current and/or voltage. This device is thus able to receive a wireless signal from the voice circuit 140 or ring indicator circuit 114 causing it to vibrate when the Transcript Telephone of the present invention is ringing. The vibration can be set to last for different time periods. The ring alert device may also have one or more LEDs or other lighting devices that blink in response to a ring signal from the ring indicator circuit 114 and/or voice circuit 140. The transmit frequencies used by the ring indicator circuit may be the same frequencies used by standard cordless telephones to convey (i.e., transmit and/or receive) information between their base (e.g., 108) and their handset (e.g., 100). Further, the ring indicator circuit 114 may also transmit wirelessly a signal to voice circuit 140 disposed in housing 144, which alerts the user through a message appearing in one or both of the displays 128 and 126 and also transmits a ring detect signal to the ring alert device (capable of vibrating) as discussed above. When the user goes 'off hook' (i.e., answers the call) or flips a switch (not shown) on the handset, the two switches (shown in open positions in FIG. 2) in the hook switch 110 close allowing the tip wire 122 and ring wire 124 from the network to be connected to transformer coil 106 and dialer 112. It should be noted that path 131 connects CPUs 130 and 132 to each other to allow the CPUs to coordinate with each other to process the respective incoming and outgoing signals.

Emanating from transformer coil 106 are a tip wire (conductor 116) for incoming signals destined for speaker 102 and a tip wire (conductor 118) for outgoing signals originating from microphone 104. In essence, the transformer coil 106 separates the incoming signals from the outgoing signals thus providing each of them their separate conductors. The circuitry and conductors for the incoming and outgoing voice signals are kept separate from each of other to provide not only physical isolation, but also electrical isolation. Electrical isolation and physical separation are done to prevent crosstalk between incoming signals and outgoing signals or any undesired signal interference between the incoming and outgoing voice signals. Conductor 120, which is typically biased at a negative DC voltage also emanates from transformer coil 106 and is used as a reference for both tip conductors (116, 118). The tip conductors 116 and 118 are routed separately from each other via housing 142 (as shown) and are terminated with female tip/ring connector having terminals M1, M2 for voice signals originating from microphone 104 (outgoing voice signals) and female tip ring connectors having terminals S1, S2 for voice signals (incoming voice signals) destined for speaker 102. The tip/ring female connectors with terminals M1, M2 and terminals S1, S2 thus form a first voice port. An additional set of female tip/ring connectors with terminals M1A, M2A and S1A, S2A respectively form a second voice port. The first and second voice ports provide accessibility to the voice signals from the microphone 104 and speaker 102 to external recording devices or other external devices, which may be connected to housing 142 via male tip/ring plugs. Although not shown, housing 142 may also contain voice buffer circuits and amplifier circuit to allow voice signals to/from the handset to be accessible to external recording devices. Male tip/ring plugs 136 and 138 and their respective conductors (136A, 138A) carry microphone and speaker voice signals to an input of voice circuit 140. Also, along with being voice ports, female tip/ring plugs M1, M2 and S1, S2 represents an interface to an analog communication network such as POTS.

In addition to the inputs/outputs to/from male plugs 136 and 138, voice circuit 140 has other inputs/outputs designed for different types of communication networks. Thus, voice circuit 140 has a communication interface comprising one or more inputs/outputs (I/O) for different communication networks through which different types of signals (e.g., voice signals, text signals, graphics signals, and video signals) can be conveyed. A second input/output to the communication interface of voice circuit 140 carries signals through a Wi-Fi interface 150. The Wi-Fi communication interface 150 may be wirelessly connected to a router or other communication device for conveying information (including voice, text, graphics, and video) via a digital communication network such as the Internet. A third exemplary I/O communication interface is an Ethernet connections 134 which may, for example, be connected to a Local Area Network or to a larger network (e.g., the Internet) for conveying information (including voice, text, graphics and video) to voice circuit 140. Thus voice circuit 140 is capable of separating incoming signals from outgoing signals, adjusting signal levels, amplifying, signals, filtering signals and performing other signal processing of digital and/or analog signals flowing through voice circuit interfaces (e.g., Wi-Fi, Ethernet, tip/ring). For example, the voice circuit may contain signal amplifiers, signal filters, A/D converters, D/A converters, digital buffers, analog buffers and other circuit blocks for proper processing of incoming and outgoing signals including voice, text, graphics, video and other types of signals.

Continuing with the example of the Transcription Telephone of FIG. 2 receiving and transmitting voice signals during an established telephone call between the Transcription Telephone and another telephone (which originated the call) via a POTS communication network interfaced to the Transcription Telephone via the tip/ring wires 122, 124 as shown, once the transcription telephone goes off hook and thus answers the call, the voice signals appear at one of the interfaces to the voice circuit as described above. The outgoing voice signals (e.g., signals from the microphone 104) after having been processed by voice circuit 140 are routed to central processing unit 132 (CPU 2) and the incoming signals (signals being received by the speaker 102), after having been processed by voice circuit 140 are also routed to central processing unit 130 (CPU 1). The Central Processing Units 130 and 132 process the incoming and outgoing voice signals and transfer them to transcribers 148 and 146 respectively for conversion to text in accordance with one or more algorithms being executed under the control of the corresponding CPU. The CPUs (130 and 132) execute the algorithm through instructions (i.e., software) stored in memory (not shown) operated and controlled by the CPUs. The associated text resulting from the transcribers (outgoing voice transcriber 148 and incoming voice transcriber 146) are displayed by display 128 and 126 respectively. In particular, Display 128 displays the text that results from the transcription of the outgoing voice signals (voice signals from microphone 104). Display 126 displays the text that results from the transcription of incoming voice signals (voice signals received by speaker 102). Each of the incoming and/or outgoing voice signals is separately processed by voice circuit 140, CPUs 130, 132, and transcribers 146, 148 as shown. Thus, during an established telephone call, a user of the Transcription Telephone of the present invention is able to view on display 126 text representing audio being received by speaker 102 and, if the user is able to speak intelligibly, view on display 128 text representing audio signals from microphone 104. A transcript of the entire telephone conversation can be stored in local memory (not shown) under the control of the central processing units 130 and 132. A transcript of the entire telephone conversation can also be stored remotely to a "cloud" in the Internet as will be discussed infra.

Still continuing with the case where the Transcription Telephone of FIG. 2 conveying (i.e., transmitting and/or receiving) voice signals during an established telephone call between the Transcription Telephone and another telephone (which originated the call) via a POTS communication network, it should be noted that the other telephone may be being operated by a user who has severe speech impediments and/or the user of the Transcription Telephone may also be someone with severe speech implements. Thus, focusing on the operation of the Transcription Telephone of FIG. 2, the incoming and/or outgoing signals may be text signals instead of voice signals. Moreover, depending on the bandwidth characteristics and overall quality of the particular POTS communication network to which the Transcription telephone is coupled, other types of information (video, graphics) may be conveyed by the Transcription Telephone. In the case of text signals being sent by the Transcription Telephone, the user may be using a standard keyboard interface with display 128. Display 128 may be a touch display that has a graphics of a keyboard being shown. Accordingly, the displayed keyboard can then be used by the user of the Transcription Telephone to type text during an established telephone call. Optionally, the Transcription telephone may have a voice synthesizer (located in voice circuit 140) that voices the words typed by the user of the Transcription Telephone. Further, the typed text can be translated to any available desired language (with the use of well known translation software within voice circuit 140 or remotely located) and then the translated text is voiced in that language, by the voice synthesizer, allowing the user to have a voice conversation in any of the available languages with the user of the other telephone. In the case of having a conversation in a foreign language, the user of the Transcription Telephone may be someone who can speak intelligibly and have his voice first transcribed into associated text, which is then translated prior to being voiced by a voice synthesizer and finally transmitted to the other party.

Instead of being connected to a POTS network, the Transcription Telephone of the present invention may be connected to a digital communication network such as the Internet, which follows a set of rules referred to as the IP (Internet Protocol) for transmitting and/or receiving voice over the Internet. Voice signals and other received signals such as text, video, and graphics are represented by digital signals arranged in accordance with some type of format (e.g., packets of bits) dictated by the rules and conventions of the Internet Protocol (IP). Incoming and outgoing signals to/from the voice circuit 140 may flow through Ethernet connector 134 (usually an RJ45 connector) or through Wi-Fi interface 150 usually implemented as a wireless connection to a router coupled to the Internet. The incoming and outgoing signals are separately processed as with the POTS signals in the discussion above with respect to FIG. 1. Voice signals (and other types of signals) may be received as blocks or packets of digital data formatted as per the IP rules. Voice circuit 140 is able to detect a ring signal from the incoming stream of digital packets (blocks of digital information arranged and interpreted as per a protocol) by extracting a block of bits representing the ring signals and then processing (D/A converter, filter and amplifier) said bits to generate a ring signal, which it transmits to ring indicator circuit 114. The transmission of the ring signal to ring indicator circuit 114 by voice circuit 140 may be done wirelessly or may be done through a wired connection (not shown) between voice circuit 140 and ring indicator circuit 114. Voice circuit 140 may also transmit the ring signals to a ring alert device being worn by a user of the Transcription Telephone where such ring alert device has a receiver, amplifier and other circuitry that receive the ringing signal from voice circuit 140 and causes a transducer to vibrate or light indicators to blink alerting the user that the Transcription Telephone is ringing. Voice signals generated by microphone 104 and inputted to voice circuit 140 via plug 136 are sampled and digitized through an A/D converter and then put in proper format (in accordance with IP rules) for transmission over either the Wi-Fi or Ethernet connections (150 or 134) to the Internet. The voice signals from the microphone 104 are also fed to CPU 132 and then to transcriber 148 for generating text that appear on display 128. Voice signals received from the Internet are converted to analog signals with a D/A converter, filters and amplifiers and are then routed to speaker 102 and also to CPU 130, transcriber 146 and these voice signals appear as text on display 126.

Connector 152 represents an AC (Alternating Current) power cord interface that is connected to a power circuit 154 that powers the circuitry and components of the Transcription Telephone. Typically, such a power circuit converts readily available AC power to DC power for proper operation of electrical/electronic devices such as the Transcription Telephone of the present invention. Further, power circuit 154 is used to power charging circuit 156, which it used to charge cellular phones and other devices. Power circuit 156 is controlled (i.e., its voltage and current outputs) by CPU 132 to provide the proper voltage and current to a device connected at connector 158. Connector 158 may be detachable to allow different types of connectors to be used to charge different types of devices.

Figure 3:
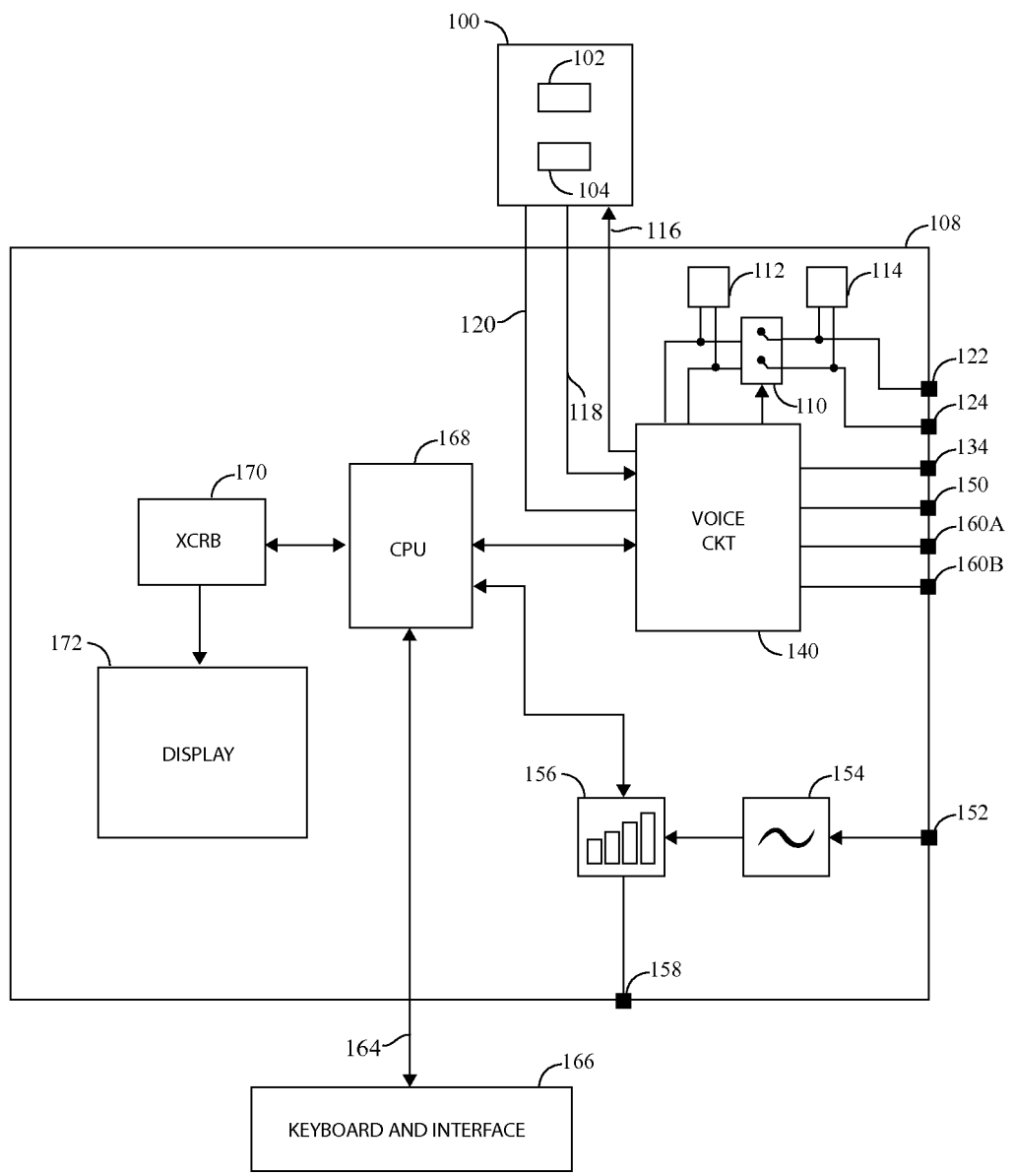
FIG. 3 is a block diagram of another embodiment of the Transcription Telephone of the present invention.

Referring now to FIG. 3, there is shown another embodiment of the Transcription Telephone of the present invention. The Transcription Telephone of FIG. 3 comprises base 108 coupled to handset 100 via a cord comprising tip wire 116 for the microphone 104, tip wire 118 for the speaker 102 and reference ring wire 120. Voice circuit 140 can be coupled to any one of various communication networks. For example, voice circuit 140 interfaces to a POTS communication network through tip/ring wires 122, 124. Voice circuit 140 interfaces to the Internet either through an Ethernet (connection 134) or a Wi-Fi interface (connection 150) as shown. Incoming voice signals are processed depending on whether these signals are analog or digital signals. As with the embodiment of FIG. 2, the analog signals on tip/ring wires connect to hook switch 110, the output of which is connected to dialer 112 and transformer coil 106 (not shown in FIG. 3). Transformer coil 106 separates the incoming wires into tip wires to speaker 102 and microphone 104 in the same or similar manner as discussed above with respect to FIG. 1.

When the Transcription Telephone of FIG. 3 is connected to a POTS network, the incoming voice signals are inputted to voice circuit 140, which performs proper processing of such signals (e.g., amplitude adjustment and filtering) and routes them to voice ports 160A, 160B and speaker 102. Also, voice circuit 140 passes the incoming voice signals onto CPU 168, which applies them to transcriber 170. Transcriber 170 converts such incoming voice signals to text, which are displayed on display 172. Outgoing voice signals originating from microphone 102 are inputted into voice circuit 140, which routes them to voice port 160A, 160B. Voice circuit 140 also routes these outgoing signals to CPU 168, which transfers them to transcriber 170 resulting in associated text displayed on display 172. The outgoing voice signals are processed by voice circuit 140, which transmits them onto the POTS network.

When the Transcription Telephone of FIG. 3 is connected to a digital network such as the Internet via Ethernet connector 134 or Wi-Fi interface 150, the incoming voice signals are in digital format and are typically arranged as digital packets. Voice circuit 140 extracts the incoming digital voice signals and converts them to analog signals that is then routed to voice port 160B, speaker 102 and CPU 168 which transfers said signals to transcriber 170 resulting in associated text of the incoming digital voice signals. For outgoing digital voice signals, the signals start as analog signals from microphone 104 and are processed by voice circuit 140, and to CPU 163 which transfers said signals to transcribers 170 converting them to text displayed on display 172. The analog signals from microphone 104 are also converted to digital signals (with an A/D converter and associated circuitry) in voice circuit 104 and arranged in whatever packetized form dictated by the standards, formats and protocols of the digital network to which the Transcription telephone is connected and the packets transmitted over that network.

Whether the Transcription Telephone of FIGS. 2 and 3 is connected to a digital network or analog network, the user of the telephone of the present invention is also able to transmit text signals instead of speaking into microphone 104 of handset 100. The text signals are generated with the use of keyboard 166 connected to base 108 via cord 164. The proper keyboard interface(s) can be located in base 108 and/or within keyboard 166. Alternatively, keyboard 166 may be interfaced to base 108 wirelessly through a Blue Tooth interface. The typed text can be applied to a voice synthesizer and allow the telephone of the present invention to transmit voice instead of text. Further, the text can be first translated into any other language and then applied to the voice synthesizer allowing the user of the Transcription Telephone of the present invention to converse with another party in another language.

It should be noted that the Transcription Telephone of FIG. 3 operates in much the same manner as the Transcription Telephone of FIG. 2. The telephone of FIG. 3 however is implemented differently than the telephone of FIG. 2 in that the telephone of FIG. 3 is able to use one Display 172, one CPU 168 and one transcriber for processing and displaying the text of both incoming and outgoing voice signals.

Both the Transcription Telephone of FIGS. 2 and 3 operate and, in particular, transcribe particular signals based on settings inputted into the telephones (into CPU 168 or CPUs 132 and 130) by the user via the keyboard or dialer. Also, the Transcription Telephones of FIGS. 2 and 3 have default settings that are downloaded onto the CPUs upon initiation of operation. Any default setting can be changed or amended by a user of the Transcription Telephone. An AC power interface 152 is provided to allow a power cord to be connected to the base of Transcription Telephone of FIG. 3, which has a power circuit 154 and a charge circuit 156 that operate in the same manner as the corresponding circuits of FIG. 2 as explained above. Transcriber 170 of FIG. 3 as well as transcribers 146 and 148 of FIG. 2 may be separate systems comprising a CPU and memory (not shown) within which reside instructions associated with one or more algorithms; the CPU (of the transcriber 170) processes the voice signals based on the instructions stored in the memory (i.e., the one or more algorithms) that process and interpret acoustic or electric voice signals incoming and outgoing to/from the Transcription Telephone and in particular to/from the voice circuit 140. Upon an establishment of a telephone call the transcribers automatically start to transcribe the voice signals and stop transcribing upon the termination of the established telephone call. Termination of the telephone call can be done by either party (going "on hook") or by the telephone system (intentionally or unintentionally). Alternatively, the transcription can be done by each of the CPUs (130, 132) and transcribers (146, 148) in the embodiment of FIG. 2. For the embodiment of FIG. 3, the transcription can be done by CPU 168 and transcriber 170. For any embodiment, however, the main CPU (i.e., CPUs 130, 132 or 178) may control the transcribers 146, 148, 170.

The operation of the Transcription Telephone of the present invention is dictated by parameters inputted via the keyboard 166 (keyboard not shown in FIG. 2) and/or dialer 112 of the telephone. The parameters are received by the CPU 168, which controls the overall operation of the Transcription Telephone. For example, when another telephone is calling the Transcript Telephone, a pre-stored message informs the originating caller is informed that he/she is calling a telephone with the capability of transcribing the phone conversation that is about to occur. This pre-stored message is stored in the Transcription Telephone and is sent to the originating telephone upon or during the establishment of the telephone call. The user and/or operator of the Transcription telephone can either activate or de-activate this pre-stored message. The originating caller will be given an opportunity to accept the condition of transcription or not by pressing one button for "no" and another button for "yes". If the originating caller does not agree to have the telephone call transcribed, the telephone call is then terminated by the Transcription Telephone. The user of the Transcript Telephone will then be notified through a message on the display 172 that the caller (caller number and possibly caller name will also be displayed) chose not to proceed with the call upon learning that the phone conversation would have been transcribed.

The user of the Transcription Telephone can then decide to modify the settings so as to de-activate the transcribing feature. The transcribing feature can also be adjusted such that only the signals from the microphone 104 are transcribed or only the signals being received by the speaker 102 are transcribed. The user of the Transcription Telephone may also decide not to transcribe any of the voice signals. Another feature of the Transcription Telephone is that the DTMF (Dual Tone Multi-Frequency) dialing can be done through dialer 112 or through the keyboard 166 or the touch screen displays 126, 128 (for FIG. 1 or 172 for FIG. 3) and where each number dialed acoustically emits a specific combination of frequency tones that is part of the standard for dialing telephone numbers. The acoustic signal can be detected by an audio detection circuit in the voice circuit 140 which can then determine the numbers dialed and associate the detected dialed numbers with a transcript of a telephone conversation that ensued as a result of the dialed numbers. Also, the dial tones generated from the act of dialing can be detected by voice circuit 140, which can then determine each number being dialed; the voice circuit sends that information to CPU 168 (or CPUs 130, 132 of FIG. 2) and the actual telephone number is used to dial another telephone or lookup stored transcripts of conversations associated with the telephone number. In other words, a dialed number is shown on the display and can result in either the Transcript Telephone dialing the number to originate a telephone call or the Transcript Telephone can search through all stored transcripts of telephone conversations associated with this number and generate a list of all such transcripts allowing the user to select which transcript he/she wants to review or download.

For both embodiments of FIGS. 2 and 3 and any other embodiment of the present invention, a transcript can be downloaded locally in a memory space (not shown) of the Transcription Telephone or to a remote location via the Internet sometimes referred to as a "cloud." The "cloud" represents some type of memory space accessible via the Internet that allows a user equipped with an Internet enabled device (such as the Transcript Telephone of the present invention) to access such memory space (using a login/password for entry) and with a command entered into the Transcription Telephone causes the telephone to download the text it is generating or has generated. The Transcription telephone, when connected to a network that provides access to the Internet, can download the text it is generating in real time so that the user or anyone else capable of obtaining access (through login/password) to the cloud (i.e., memory space of the Transcription Telephone) can view the text as it is being generated by the Transcription Telephone. Alternatively, upon the termination of the established telephone call between the Transcription Telephone and another telephone, the Transcription Telephone can download a transcript of the entire telephone conversation onto the memory space in the cloud. The CPUs (either one or both 130, 132 in FIG. 2 or the CPU 168 in FIG. 3) may be able to execute Internet browsing software and other Internet related software to allow a user of the Transcription Telephone to gain access to a particular site where its memory space is located and enter (after inputting of, for example, a login/password) the site and memory space to view various stored transcripts of telephone conversations. In short, the Transcription Telephone of the present invention may also be an Internet enabled device.

Upon the termination of an established telephone call in which the setting allowed text for both incoming or outgoing or both types voice signals to be transcribed, another setting of the Transcription Telephone of the present invention, will cause the Transcription Telephone to automatically store the transcript of the telephone conversation in the cloud or in local memory (local memory not shown in FIGS. 2 and 3). The Transcription Telephone and other Internet enabled devices such as laptops, cellular phone (e.g., smart phones), tablets, desktop computers and other communication devices are capable of gaining access to the Internet through the use of Internet browsers such as Explorer, Safari, Windows Mobile, Netscape Navigator, Lynx Symbian, and receive information not only in their original formats, but also in Java, Flash, HTTP/S TEXT and XML formats. The Transcription Telephone thus contains the necessary software to automatically obtain access to the Internet and transmit the displayed text (incoming voice, outgoing voice or both being shown as text on the displays 126, 128 and 172 of FIGS. 2 and 3) in real time at a remote site via the Internet allowing a user or anyone having access to the "cloud" in the Internet to see the text in real time as it is being generated by the Transcript Telephone of the present invention. The Internet related software such as browsers and other software may be stored in memory (not shown) associated one of the CPUs (130, 132 or 170 of FIGS. 2 and 3) and executed by one of the CPUs and the voice circuit (140 of FIGS. 2 and 3). It will be readily understood that the Transcription Telephone of the present invention can be coupled or connected to two different networks simultaneously as the voice circuit 140 has interfaces for different communication networks. For example, the Transcription Telephone of the present invention may be connected to the POTS network via tip/ring connectors 122 and 124 while at the same time connected to the Internet via Ethernet connector 134. Thus, for example, the Transcription Telephone of the present invention can be part of an established telephone call and be able to transmit text signals for storage in the cloud while at the same time transmit text over the POTS network to another telephone with which it is having a telephone call. Thus in general, the Transcription Telephone of the present invention can be sending and/or receiving text or voice or other types of signals through different types of communication networks simultaneously.

It will also be readily understood that the Transcription Telephone of the present invention (FIGS. 2 and 3) may be connected to a network (such as the Internet) to transmit and store associated text from the transcription of a user's voice to a remote location or a 'cloud.' That is, a user can independently generate a transcript of words spoken by the user (e.g., a memo, list of reminders, description of an event being observed by the user). Independent generation of a transcript refers to a scenario where a user uses the Transcription Telephone to transcribe a subject matter being voice by the user; that is, the transcription is not done in the context of an established telephone call with another telephone being used by another user. For example, the Transcription Telephone may be connected to the Internet via Ethernet connector 134 or Wi-Fi interface 150 and the user may wish to transcribe his/her recollection of an event or his/her understanding of a new concept. The user voices his/her recollection, which is then transcribed by the Transcription Telephone of the present invention. Such a transcription can also be referred to as a one way transcription. Because the Transcription Telephone of the present invention is an Internet enabled device, a user may access a website where a cloud containing storage space is located. Initially, the user can enter an "access cloud" command or click on an icon representing an 'access cloud' (AC) command. It is assumed that the Transcription Telephone may present the user with a GUI, which the user can use to interact with the Transcription Telephone of the present invention. Upon reception of the AC command from a user, the Transcription Telephone of the present invention automatically accesses a website wherein a memory space allocated for the user is located. The website or the Transcription Telephone may request the user to enter username/login and password information. Upon entering the correct information, the user is then allowed to start transcribing his/her voice by first typing (or clicking on an icon) a Start Transcription (ST command). Upon entering the ST command, the user can speak into the speaker of the Transcription Telephone allowing the Transcription Telephone to transcribe the words spoken by the user and transmit the associated text to the website. When the user has finished transcribing, he or she can enter an End Transcription command (ET), by typing the command or clicking on an appropriate available icon. The user can then give the transcript a filename or label and exit the cloud (through proper available commands). In this manner a user can independently generate a transcript of a particular subject matter and store it in the cloud. Further, the user can generate a similar transcript, but store such transcript in local memory instead of in the cloud. Further, the user can transfer any transcript stored in local memory of the Transcription Telephone to the cloud by accessing the cloud in the manner described above and entering (or clicking) a TT (Transfer Transcript) command followed by the name of the file (i.e., the transcript) the user wants to transfer to the cloud. The commands typed or clicked by the user are received by the CPU(s) of the Transcription Telephone and the CPU(s) causes the Transcription Telephone to access the cloud and allows voice signals received by the microphone of the handset of the Transcription Telephone to be transcribed.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary aspects, but should be defined only in accordance with the following claims and their equivalents.

In addition, it should be understood that the Figures in the attachments, which highlight the structure, methodology, functionality and advantages of the present invention, are presented for example purposes only. The present invention is sufficiently flexible and configurable, such that it may be implemented in ways other than that shown in the accompanying figures.

What is claimed is:
1. A Transcription Telephone comprising:
   at least one central processing unit comprising a first central processing unit for processing incoming voice signals and a second central processing unit for processing outgoing voice signals during an established telephone call; and a voice circuit where the first central processing unit controls a first transcriber for transcribing incoming voice signals into associated text displayed on a first touch screen display and the second processing unit controls a second transcriber for transcribing outgoing voice signals into associated text displayed on a second touch screen display.

2. The Transcription Telephone of claim 1 where the transcription of voice signals occurs during an established telephone call involving the transcription telephone.

3. The Transcription Telephone of claim 1 where the voice circuit comprises a voice port providing access to incoming and outgoing voice signals of an established telephone call.

4. The Transcription Telephone of claim 1 where the voice circuit separately routes incoming and outgoing voice signals to electrically isolate them from each other.

5. The Transcription Telephone of claim 1 where the central processing unit causes the voice circuit to transmit a pre-stored message to a telephone of a calling party upon establishment of a telephone call between the transcription telephone and the telephone of the calling party.

6. The Transcription Telephone of claim 1 where the central processing unit causes the voice circuit to transmit a pre-stored message to a telephone of a called party upon establishment of a telephone call between the transcription telephone and the telephone of the called party.

7. The Transcription Telephone of claim 1 where the voice circuit detects DTMF signals of a telephone number dialed on the transcription telephone where such telephone number is stored and is associated with a stored transcript of an ensuing established telephone call.

8. The Transcription Telephone of claim 1 further comprising a keyboard interface coupled to the central processing unit allowing a corded keyboard to be connected to the transcription telephone.

9. The Transcription Telephone of claim 1 further comprising a keyboard interface coupled to the central processing unit allowing a cordless keyboard to be wirelessly connected to the transcription telephone.

10. The Transcription Telephone of claim 1 where the transcriber comprises one or more algorithms stored in memory and whose operation is controlled by the central processing unit where instructions associated with the one or more algorithms are executed by the central processing unit to transcribe incoming voice signals and/or outgoing voice signals into associated text.

11. The Transcription Telephone of claim 1 where the one or more received parameters determine which type of voice signals are to be transcribed into text.

12. The Transcription Telephone of claim 1 where the voice circuit comprises an interface circuit for each type of communication network to which the transcription telephone can be connected and where each such interface is capable of converting outgoing voice signals to a format compliant with a proper destination communication network and each such interface is capable of detecting incoming voice signals for processing by the central processing unit and the transcriber.

13. The Transcription Telephone of claim 1 where received voice signals of a user can be independently transcribed based on various commands received by the at least one central processing unit.

14. The Transcription Telephone of claim 13 where a transcript resulting from an independent transcription is stored locally within the Transcription Tel or remotely in a cloud.

\* \* \* \* \*